United States Patent
Fry (10) Patent No.: US 10,535,158 B2
(45) Date of Patent: Jan. 14, 2020

(54) POINT SOURCE IMAGE BLUR MITIGATION

(71) Applicant: The Johns Hopkins University, Baltimore, MD (US)

(72) Inventor: Robert L. Fry, New Windsor, MD (US)

(73) Assignee: The Johns Hopkins University, Baltimore, MD (US)

(*) Notice: Subject to any disclaimer, the term of this patent is extended or adjusted under 35 U.S.C. 154(b) by 0 days.

(21) Appl. No.: 15/685,109

(22) Filed: Aug. 24, 2017

(65) Prior Publication Data

US 2018/0061080 A1 Mar. 1, 2018

Related U.S. Application Data

(60) Provisional application No. 62/378,726, filed on Aug. 24, 2016.

(51) Int. Cl.
| | | |
|---|---|---|
| *G06T 7/73* | (2017.01) | |
| *H04N 5/33* | (2006.01) | |
| *G06T 7/246* | (2017.01) | |
| *G06T 5/00* | (2006.01) | |

(52) U.S. Cl.
CPC .............. *G06T 7/74* (2017.01); *G06T 5/003* (2013.01); *G06T 7/248* (2017.01); *H04N 5/33* (2013.01); *G06T 2207/10048* (2013.01); *G06T 2207/20201* (2013.01); *G06T 2207/30241* (2013.01); *G06T 2207/30252* (2013.01)

(58) Field of Classification Search
CPC ........... G06T 7/74; G06T 7/248; G06T 5/003; G06T 2207/10048; G06T 2207/20201; G06T 2207/30241; G06T 2207/30252; H04N 5/33

USPC ........................................................ 348/116
See application file for complete search history.

(56) References Cited

U.S. PATENT DOCUMENTS

| | | | |
|---|---|---|---|
| 7,969,345 B2 | 6/2011 | Abatzoglou et al. | |
| 8,547,441 B2 | 10/2013 | Ben-Ezra et al. | |
| 9,420,185 B2 | 8/2016 | Oh | |
| 9,552,630 B2 | 1/2017 | McCloskey et al. | |
| 2004/0125228 A1* | 7/2004 | Dougherty | G01S 11/12 348/345 |
| 2007/0183686 A1* | 8/2007 | Ioffe | G06K 9/00248 382/291 |
| 2008/0149813 A1* | 6/2008 | Weaver | H04N 5/2259 250/208.1 |
| 2010/0245602 A1* | 9/2010 | Webster | H04N 5/211 348/208.4 |

(Continued)

*Primary Examiner* — Anner N Holder
*Assistant Examiner* — Matthew David Kim
(74) *Attorney, Agent, or Firm* — Sung T. Kim (57) ABSTRACT

Apparatuses and methods for point source image blur mitigation are provided. An example method may include receiving, from an imaging detector, a plurality of pixel signals associated with respective pixels of an image over a stare time, and determining a trajectory of a point source within the image due to relative angular motion of the point source across a plurality of pixels of the image. The example method may further include determining a subset of pixels that intersect with the trajectory, and determining an estimated location of the point source within the image at an end of the stare time based on the pixel signals for each of the pixels within the subset of pixels.

20 Claims, 8 Drawing Sheets

(56) References Cited

U.S. PATENT DOCUMENTS

| | | | |
|---|---|---|---|
| 2011/0134249 A1* | 6/2011 | Wood | G01C 3/08 348/164 |
| 2011/0199492 A1* | 8/2011 | Kauker | G06T 5/003 348/208.1 |
| 2013/0242129 A1* | 9/2013 | Harmeling | G06T 5/001 348/222.1 |
| 2015/0103190 A1 | 4/2015 | Corcoran et al. | |

* cited by examiner

POINT SOURCE IMAGE BLUR MITIGATION

CROSS-REFERENCE TO RELATED APPLICATIONS

This application claims the benefit of U.S. Provisional Application No. 62/378,726 filed on Aug. 24, 2016, the entire contents of which are hereby incorporated herein by reference.

TECHNICAL FIELD

Example embodiments generally relate to image processing and, more particularly, relate to techniques for improving image clarity and de-blur.

BACKGROUND

Microbolometer detectors offer an inexpensive solution for acquiring Long-Wave Infrared (LWIR) imagery. These detectors can cost several orders of magnitude less than other infrared imaging technologies that require cryo-cooling sub-systems. However, microbolometer detectors have a drawback in that the images captured by the detectors suffer from significant blurring in situations where there is relative motion between a target and the detector.

BRIEF SUMMARY OF SOME EXAMPLES

According to some example embodiments, an apparatus for point source de-blurring is provided. In this regard, the example apparatus may comprise an imaging detector. The imaging detector may comprise an array of sensors. The imaging detector may be configured to capture radiant energy corresponding to an image over a stare time and generate a plurality of pixel signals associated with respective pixels of the image. The example apparatus may further comprise processing circuitry. The processing circuitry may be configured to receive the plurality of pixel signals from the imaging detector, determine a trajectory of a point source within the image due to relative angular motion of the point source across a plurality of pixels of the image, and determine a subset of pixels that intersect with the trajectory. The processing circuitry may also be configured to determine an estimated location of the point source within the image at an end of the stare time based on the pixel signals for each of the pixels within the subset of pixels.

Another example apparatus is also provided. The example apparatus may comprise an imaging detector comprising an array of sensors. The imaging detector may be configured to capture radiant energy corresponding to an image over a stare time and generate a plurality of pixel signals associated with respective pixels of the image. The example apparatus may further comprise a navigation controller configured to control guidance of a vehicle based on an estimated location of a point source. In this regard, the apparatus may be operably coupled to or in communication with the vehicle. The apparatus may further comprise processing circuitry. The processing circuitry may be configured to receive the plurality of pixel signals from the imaging detector, determine a trajectory of a point source within the image due to relative angular motion of the point source across a plurality of pixels of the image, and determine a subset of pixels that intersect with the trajectory. The processing circuitry may also be configured to determine an estimated location of the point source within the image at an end of the stare time based on the pixel signals for each of the pixels within the subset of pixels.

An example method is also provided. In this regard, the example method may comprise receiving, from an imaging detector, a plurality of pixel signals associated with respective pixels over a stare time. The imaging detector may comprise an array of sensors. Further, the example method may comprise determining a trajectory of a point source within the image due to relative angular motion of the point source across a plurality of pixels of the image, determining a subset of pixels that intersect with the trajectory, and determining an estimated location of the point source within the image at an end of the stare time based on the pixel signals for each of the pixels within the subset of pixels.

BRIEF DESCRIPTION OF THE SEVERAL VIEWS OF THE DRAWING(S)

Having thus described some the example embodiments in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout.

As used herein the term "or" is used as the logical or where any one or more of the operands being true results in the statement being true. As used herein, the phrase "based on" as used in, for example, "A is based on B" indicates that B is a factor that determines A, but B is not necessarily the only factor that determines A.

As mentioned above, microbolometer-based infrared imaging systems can show significant image blurring when capturing an image of a point source moving target (e.g., an object of interest such as a vehicle, a building, or the like).

A microbolometer detector may be comprised of a plurality of sensors, each of which is associated with a pixel of an image captured by the microbolometer detector. In this regard, according to some example embodiments, the sensors may be disposed in an adjacent pattern (e.g., matrix array) to form a focal plane array (FPA) of sensors. The radiant energy (e.g., infra-red light) received at a sensor of a microbolometer detector may be used to generate an output signal for the sensor. Due to the relatively slow integration time of the microbolometer detector, the output signal may decay exponentially over time. As such, a point source moving target may affect the outputs of a number of sensors, and therefore be mapped to a number of pixels of the detector over the time required to capture an image (e.g., the stare time). As such, rather than generating a crisp image of the point source at a given time, the microbolometer detector may generate an image with significant blurring with respect to the point source. Such blurring can inhibit the ability to use the detectors for target tracking and measuring a target's intensity or amplitude.

Accordingly, some example embodiments provide for an ability to determine a location of a point source within an image captured by an array of microbolometer sensors. In this regard, being able to determine a location or estimated location of the point source in, for example, two dimensions may permit a sensor array to be used in various applications including navigation applications that require tracking of an object or point source. Uncompensated motion of the sensor or the target point source, or a combination thereof, may lead to smearing of the target point source when images are acquired. According to some example embodiments, apparatuses and methodologies are described herein that facilitate the mitigation of blurring effects and provide the ability to precisely locate a point source object in two dimensions despite blurring.

According to some example embodiments, an example technique is provided herein that digitally mitigates image blur caused by relative motion of a point source, thereby increasing the application opportunities for microbolometer detectors in both commercial and military applications, including in navigation controllers of tactical weapons systems. In this regard, the example technique may employ an optimal algorithm for de-blurring imagery in near-real-time to support tracking of a point source or target while the detector or the target are moving. According to some example embodiments, the example technique may leverage a statistical maximum likelihood approach to obtain an estimated location of the point source. Sub-pixel tracking can also be realized for a point source target in addition to amplitude estimation. Additionally, the example technique may also aid inertial measurement unit (IMU) functionality to refine pitch and yaw motions of an imaging apparatus. It is understood that while some examples and concepts are described for determining a location of a point source at the sub-pixel level, the example techniques provided herein are equally applicable to pixel level determination as well.

Figure 1A:
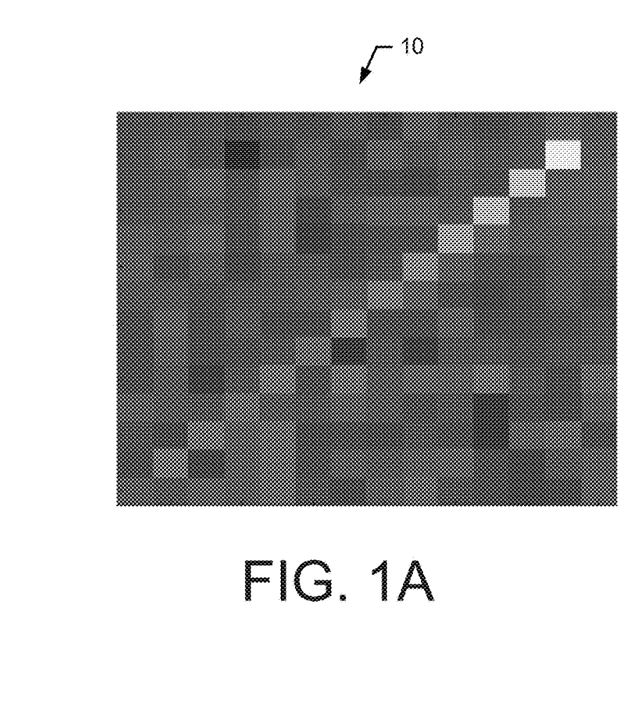
FIG. 1A shows an example raw image according to an example embodiment.
Figure 1B:
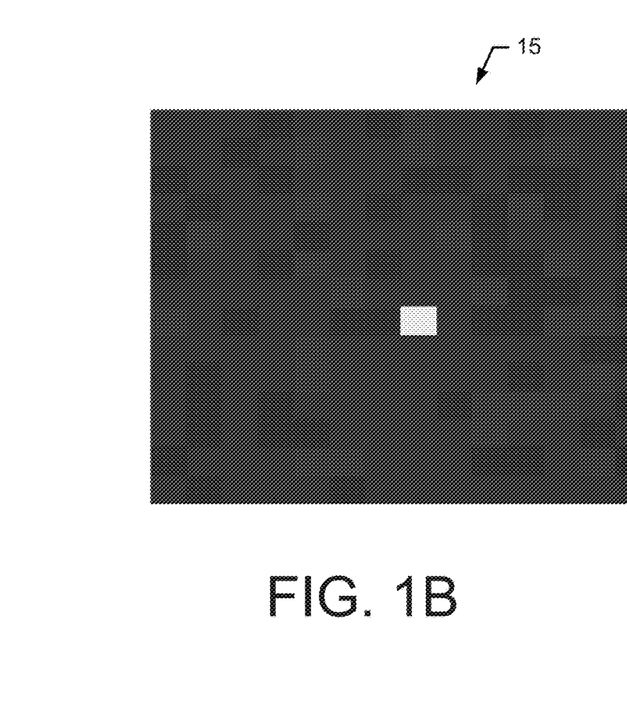
FIG. 1B shows an example modified image with image blur mitigation according to an example embodiment.
Figure 2:
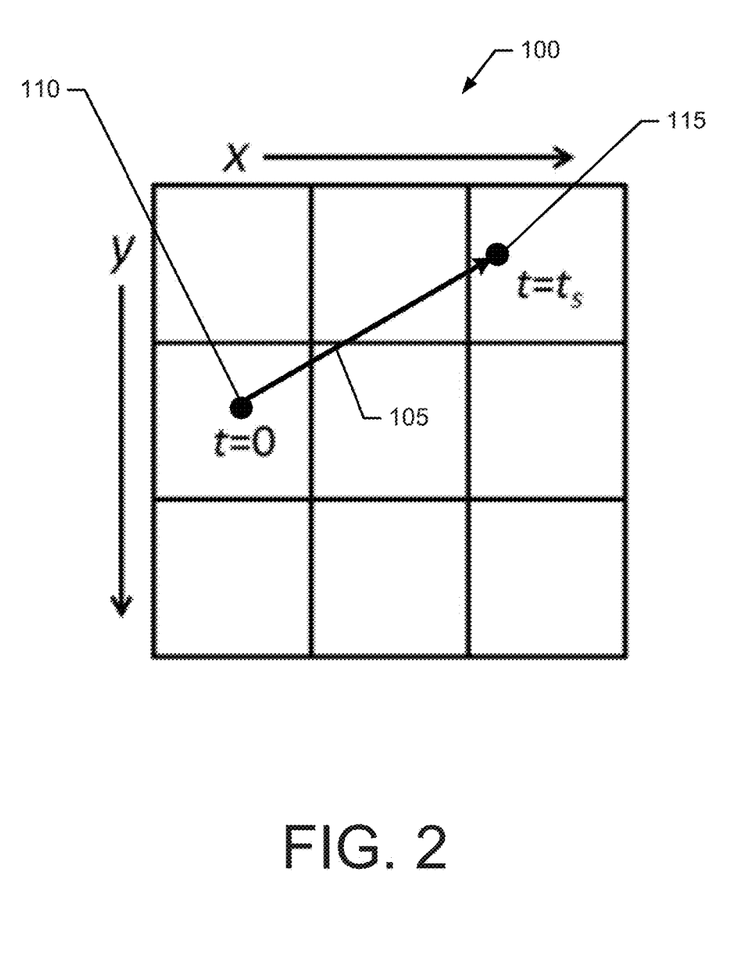
FIG. 2 shows an example focal plane array with a trajectory of a point source according to an example embodiment.

In this regard, FIG. 1A shows an example raw image 10 provided by an imaging detector, such as, a microbolometer detector. Because there was relative movement between the detector and the point source, blurring of the point source across the image 10 can be seen from the lower left of the image 10 to the upper right, with the upper right having the brightest pixels. This blurring can be the result of the relative long integration time or stare time for an image capture by a microbolometer detector. Using the example techniques described herein, the raw image 10 may be de-blurred to estimate a location of a point source as shown in the image 15 of FIG. 1B, which has been translated in space to center the target point source. The modified image 15 shows a single point source represented by a single pixel with high contrast due to blurring mitigation. According to some example embodiments, as further described below, estimating the location of the point source may involve estimating the location at a pixel or sub-pixel scale.

According to some example embodiments, an example technique for image blur mitigation to estimate a location of a point source will now be described with respect to FIGS. 2 through 5. In this regard, during a stare time for an image capturing event, a microbolometer pixel (ij) may be represented as an optical signal generated by a sensor, and described as $$s_{ij}(t) t \in [0, t_s] \quad (1)$$

where $t_s$ is the single-frame microbolometer stare time.

The physics of a microbolometer sensor may induce the convolution of a first-order low-pass filter h(t) to the composite signal $s_{ij}(t)$ such that a composite readout value $x_{ij}(t_s)$ prior to measurement noise is given by $$x_{ij}(t_s) = \int_0^{t_s} s_{ij}(\tau) h(t - \tau) d\tau \quad (2)$$

In this regard, it is assumed that no residual signal is present at the beginning of the stare time, i.e., zero initial conditions for this integral. It is also assumed that imaging blurring occurs during the stare time against a point source due to relative movement of the detector with respect to the point source. In this regard, the blurring may arise due to the presence of uncompensated angular motion along imaging axes during the detector's stare time. The uncompensated motion may be estimated against a linear trajectory, resulting in a linear path or trajectory across the focal plane array (FPA) of the detector. In this regard, any pixel area can be thought of as being comprised by a 2-dimensional sub-pixel array and the following analysis may be performed at the sub-pixel level or the pixel level. The linear trajectory of the point source may begin at a pixel coordinate at t=0 and then end at another pixel coordinate at t=$t_s$. As shown with respect to the FPA 100 of FIG. 2, defined by an x and y origin and coordinate system, the linear trajectory 105 may begin at a pixel coordinate 110 at t=0 and then end at another pixel location 115 at t=$t_s$.

Figure 3:
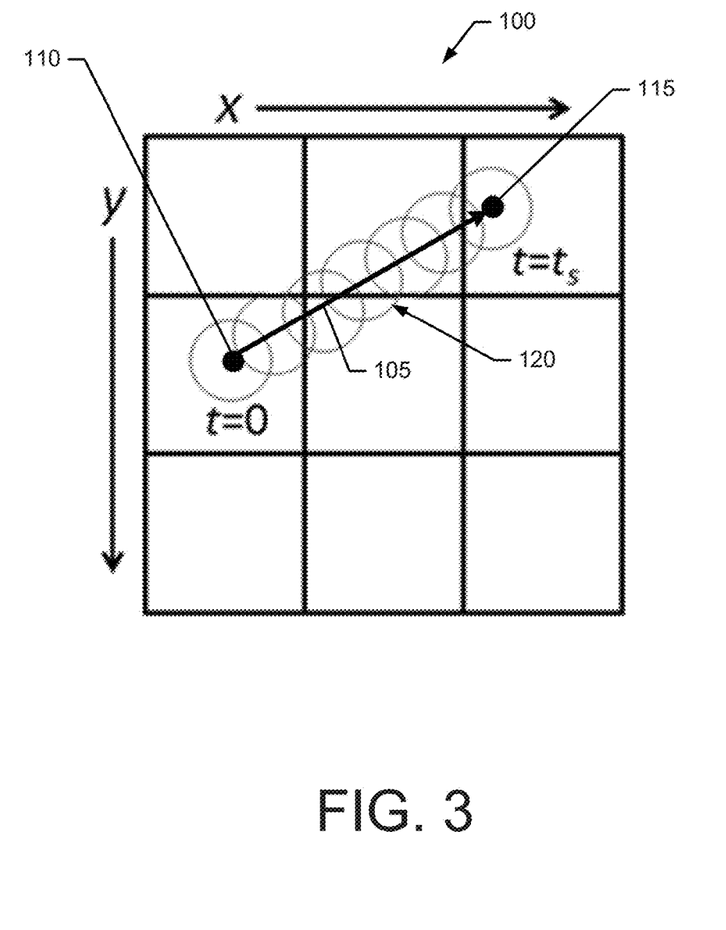
FIG. 3 shows an example focal plane array with a point spread function according to an example embodiment.

An aperture of the imaging system including an FPA and elements of the optical design may impose point spread functions (PSFs) that may vary at points ($x_0, y_0$) across the aperture. As such, a spatially varying PSF may be represented by the function $g(x-x_0, y-y_0)$. An example PSF 120 is illustrated in FIG. 3 across a region of interest (ROI) on the same trajectory as the linear trajectory 105.

Figure 4A:
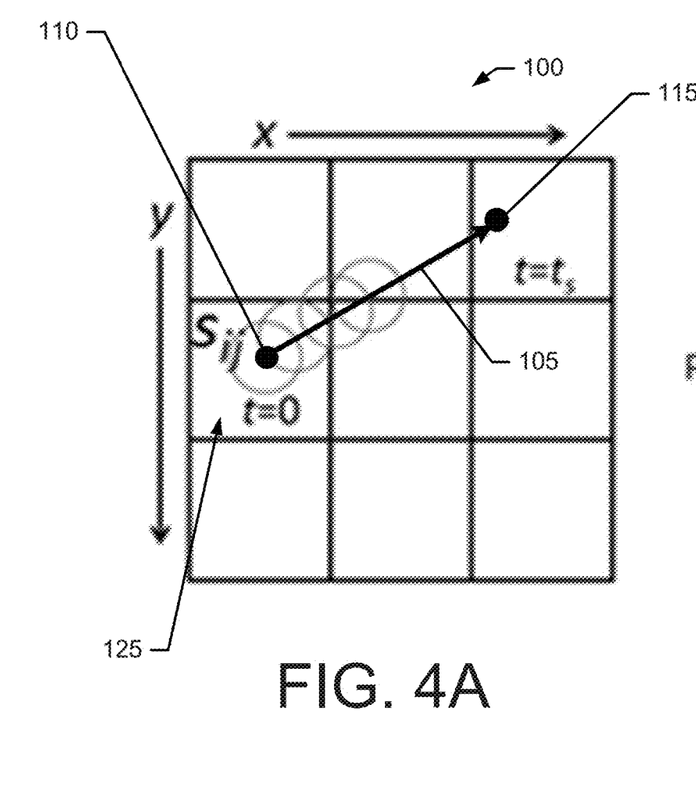
FIG. 4A shows another example focal plane array according to an example embodiment.
Figure 4B:
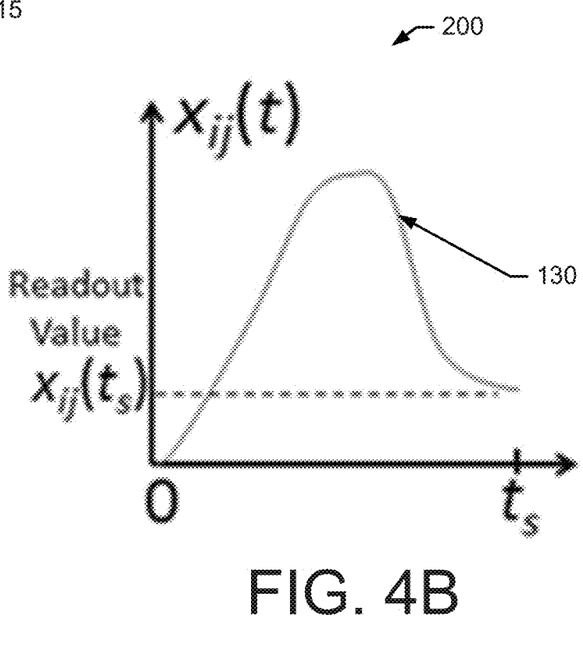
FIG. 4B shows a chart of an irradiance signal according to an example embodiment.

As stated above, each pixel of an FPA may observe and filter a signal $s_{ij}(t)$. FIGS. 4A and 4B illustrate a signal arising from the motion of a point source across a 3 by 3 pixel array. In this regard, FIG. 4A shows the linear trajectory 105 beginning at time t=0 and ending at timet=$t_s$ travelling through pixel 125. FIG. 4B shows a chart 200 of the time-varying irradiance signal 130 arising from the pixel 125 labeled $s_{ij}$. FIG. 4B shows the time-varying signal arising from the pixel labeled $s_{ij}$ depicting how a pixel value increases when illuminated and how the signal decays once the source energy ceases to influence that pixel.

The instantaneous irradiance falling on the pixel 125 may be determined, where A may be the overall irradiance of the point source with a time-varying sub-pixel location [x(t),y(t)]. The convolution of the irradiance of a point source with a PSF optical system may be given by equation (3) below.

$$s_{ij}(t) = A \int\int_{D_{ij}} g[x' - x(t), y' - y(t)] dx' dy' \quad (3)$$

The locations x(t) and y(t) may depend on where the point source is located at the end of the stare time and where the point source was located going backwards in time. In this regard, suppose that the point source endpoint is located at $x_1 = x(t_s)$ and $y_1 = y(t_s)$ at the end of the stare time. Furthermore, suppose that the uncompensated angular motion induces a 2-D blur rate that is known and given by $\omega = (\omega_x, \omega_y)$. Accordingly, $$x(t) = x_1 - \omega_x(t_s - t); 0 \leq t \leq t_s,$$

$$y(t) = x_1 - \omega_x(t_s - t) \quad (4)$$

As such, an endpoint can be specified (or one hypothesized) and an analysis can be performed backwards conditioned on knowledge of the uncompensated angular rate. Based on the four parameters $(\omega_x, \omega_y, x_1, y_1)$, the sub-pixel trajectory of the point source across the FPA can be reconstructed. These four parameters will be treated as possible hypotheses as selected based on inertial measurement unit (IMU) data and uncertainties. Furthermore, the amplitude does not impact the trajectory. Equation (4) may also dictate the starting (x,y) location of the point source on the FPA. This is given by $(x_0, y_0)$ where $$x_0 = x_1 - \omega_x t_s$$

$$y_0 = y_1 - \omega_y t_s \quad (5)$$

Figure 5:
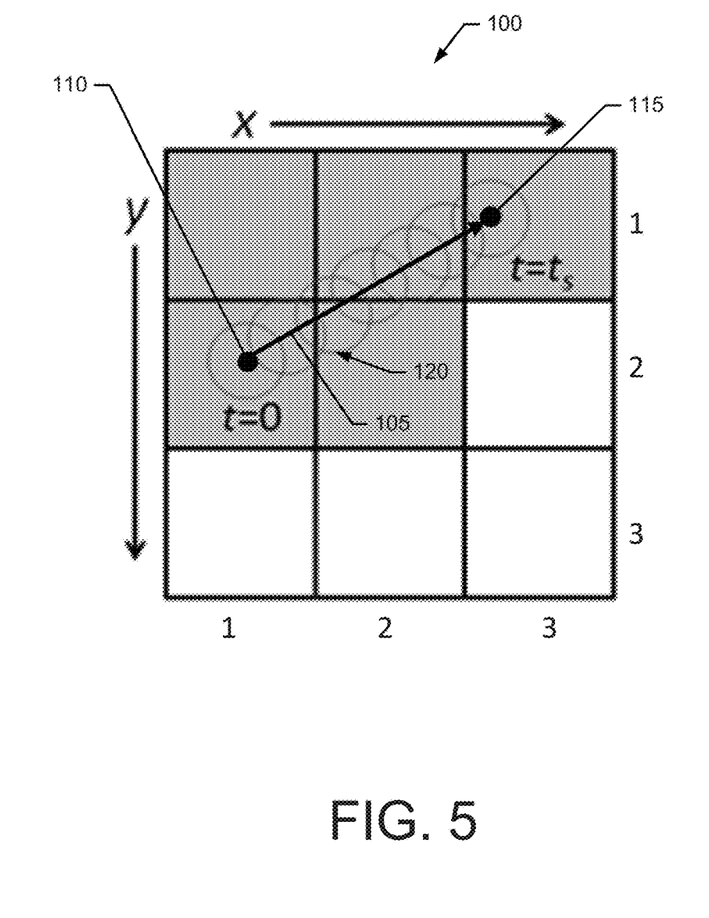
FIG. 5 shows an example focal plane array with a pixel clique according to an example embodiment.

Further, suppose that the radius of the optical PSF is less than ½-pixel in size. In this case, the energy of the point source will be contained in a region of interest of, at most, 2 by 2 adjacent pixels. Furthermore, one can exactly specify which pixels within the FPA receive energy from the point source at any point during the stare interval. Thus, associated with each point $\theta = (\omega_x, \omega_y, x_1, y_1)$, there is associated a unique ensemble of pixels which are known to be affected for a given trajectory, and therefore intersect with the trajectory. This aspect is depicted in FIG. 5 where, in this example scenario, five pixels—namely pixels (1,1), (1,2), (2,1), (2,2), and (3,1)—are affected by operation of the PSF. This subset of pixels may be defined as a "clique" and denoted $C_\theta$. A clique may correspond to a set of discrete integral coordinates of pixels on the FPA.

Accordingly, equation (3) may be re-written as $$s_{ij}(t) = A \int\int_{D_{ij}} g[x' - x(t; \theta), y' - y(t; \theta)] dx' dy' \quad (6)$$

thereby showing explicit dependence of the trajectory defined by equation (4) on the specified $\theta$. Further, knowledge of detected signal $s_{ij}(t)$ enables the application of the microbolometer low-pass filter to determine the read out value $x_{ij}(t_s)$ through equation (2).

If the noisy signal read out of a microbolometer array is $q_{ij}(t_s; \theta) = x_{ij}(t_s; \theta) + n_{ij}$ where $n_{ij}$ is additive white Gaussian noise having zero-mean and variance $\sigma^2$, and if noise is independent pixel-to-pixel, then the likelihood function for the measurement set $q_{ij} \varepsilon \bar{q}(\theta)$ as measured over the clique $C_\theta$ may be given by $$p(\vec{q}|\theta) = \prod_{(i,j) \in C_\theta} \frac{1}{(2\pi\sigma^2)^{1/2}} \exp\left[\frac{-(q_{ij} - Ax_{ij}(\theta))^2}{2\sigma^2}\right] \quad (7)$$

Finding the parameter vector $\theta$ and parameter value A that maximizes this likelihood function becomes the objective. Further, A may be included in the parameter vector $\theta$ to simply maximize equation (7) over the parameter vector, acknowledging that A does not impact the trajectory of the point source.

The double integral in equation (6) and the filter in equation (2) may be computed, according to some example embodiments, in advance, for the desired ranges of values for the parameters in $\theta$ and tabulated in the form of a multi-dimensional look-up table stored in memory. By doing so, the real-time need to compute large numbers of 2-dimensional integrals may be avoided, which may facilitate optimization of the likelihood function for use in a tactical application.

The negative logarithm of equation (7) may also be optimized or minimized, and may be given by $$-\log p(\vec{q}|\theta) = \sum_{(i,j) \in C_\theta} \left[\frac{(q_{ij} - Ax_{ij}(\theta))^2}{2\sigma^2}\right] + \frac{N_\theta}{2} \log 2\pi\sigma^2 \quad (8)$$

The last term in equation (8) does not change the location of a maxima and so, this term may be omitted from consideration. Also, the $2\sigma^2$ factor is common to all terms in the sum and therefore can also be eliminated. As such, an "energy like" function $E(\theta)$ may be minimized which is given by $$E(\theta) = \sum_{(i,j) \in C_\theta} (q_{ij} - AX_{ij}(\theta))^2 \quad (9)$$

According to some example embodiments, a number of techniques of performing optimization may be utilized to determine the best estimated parameter values. In this regard, the one technique may be a global search over a discretized parameter space $\theta$. A second technique may be to minimize the energy function of equation (9) using simulated annealing over the entire parameter space. Another technique may be to assess the convexity of the energy function and if it is convex, apply an optimization method such as Newton-Raphson. However, maximum likelihood functions may not be convex and therefore such solution methodologies may not be ideal.

The posed optimization problem also does not include IMU measurements and uncertainties. This can be achieved by introducing a density function for $\omega = (\omega_x, \omega_y)$ given IMU measurements and uncertainties. Here it may be assumed that the density function may be given by $$p(\omega_x, \omega_y \mid IMU) = \tag{10}$$

$$\frac{1}{\sqrt{2\pi\sigma_x^2}}\exp\left[-\frac{(\omega_x - \mu_x)^2}{2\sigma_x^2}\right]\frac{1}{\sqrt{2\pi\sigma_y^2}}\exp\left[-\frac{(\omega_y - \mu_y)^2}{2\sigma_y^2}\right]$$

The resulting energy function may be given by $$E(\theta, \omega \mid IMU) = \sum_{(i,j) \in C_\theta} \left[\frac{(q_{ij} - Ax_{ij}(\theta))^2}{2\sigma^2}\right] + \tag{11}$$

$$\frac{N_\theta}{2}\log 2\pi\sigma^2 + \frac{(\omega_x - \mu_x)^2}{2\sigma_x^2} + \frac{(\omega_y - \mu_y)^2}{2\sigma_y^2} + \log 2\pi(\sigma_x^2 + \sigma_y^2)$$

Equation (11), unlike in equation (9), cannot eliminate dependencies of the energy function on the separate variances of the IMU measurements and microbolometer noise.

Further, equation (11) may be optimized explicitly or the IMU data may be used to constrain the 4-dimensional hypothesis search space for constrained global search or constrained annealing. Constant terms in equation (11) may be eliminated from the optimization. Inclusion of IMU measurements and uncertainties in the optimization may indicate that the IMU measurements and uncertainties may be improved depending on the quality of collected signature information that enables deblurring.

Figure 6:
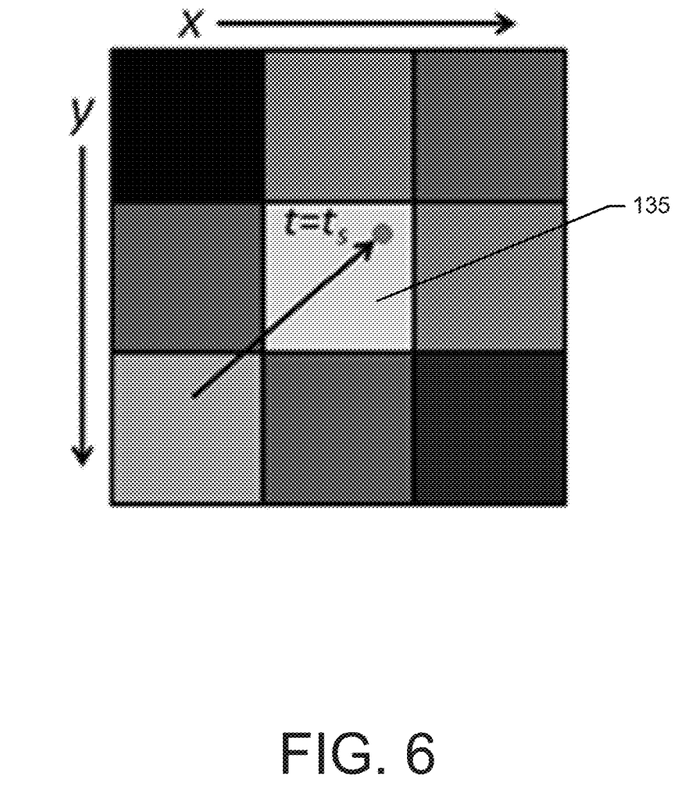
FIG. 6 shows an example focal plane array with a determined endpoint pixel according to an example embodiment.

The sizing of the search subspace space may depend on practical considerations. The point source coordinate search region may be based on the following analysis. The detection process may disclose the estimated location or endpoint of the point source at the end of the stare time. Because of the constraint on the size of the PSF to be less than ½ a pixel, the endpoint $(x_1, y_1)$ may be constrained to lie within one pixel of the pixel 135. In this regard, FIG. 6 illustrates this situation, where pixel 135 is lighter because the point source has spent more time at locations within the pixel 135. Pixel 135 is associated with the final location of the point source, and therefore has had less time for the signal of the pixel 135 to decay.

Given the system resolution capability and knowledge of the PSFs, 10×10 or 20×20 sub-pixel hypotheses may be sufficient, which would yield 300 and 1200 sub-pixel location hypotheses, respectively. These then comprise the search space for the object 2-D track.

Accordingly, the range of values to use for the angular rates $\omega_x$ and $\omega_y$ depend on IMU uncertainties. These uncertainties also dictate the size of the space that is optimized over. Also, noisy image measurements can be used to reduce these uncertainties thereby improving IMU precision. For instance, it may be necessary to sample across the 3-σ range of possible values along both imaging axes with density of values determined by Gaussian density itself, i.e., use importance sampling.

Figure 7:
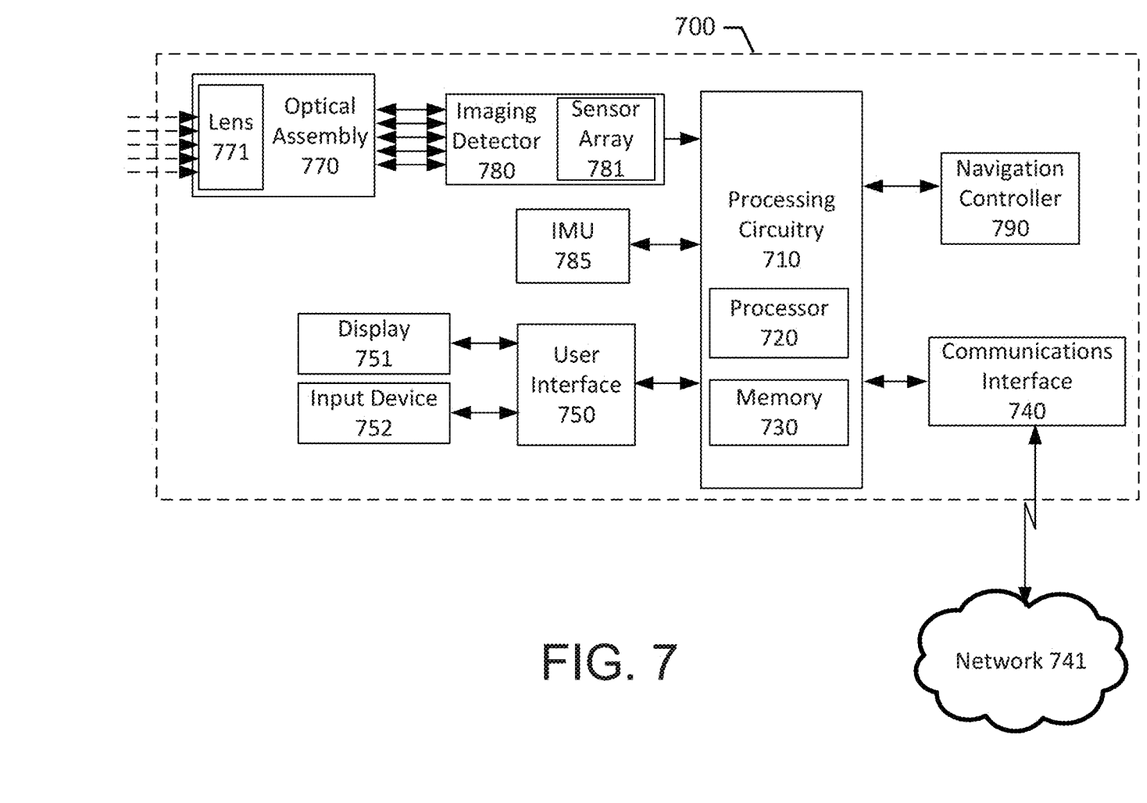
FIG. 7 shows an example apparatus for performing image blur mitigation according to an example embodiment.

FIG. 7 provides a block diagram of an example of an apparatus 700 configured to perform image blur mitigation according to some example embodiments. According to some example embodiments, the apparatus 700 may include components configured to support radiant energy imaging (e.g., infrared imaging). In this regard, with respect to radiant energy imaging, the apparatus 700 may include an optical assembly 770 and an imaging detector 780. The optical assembly 770 may include one or more lenses 771 to receive and direct radiant energy (e.g., infrared light) to the imaging detector 780. According to some embodiments, the optical assembly 770 may include an aperture through which the radiant energy passes prior to being received by a sensor array 781 of the imaging detector 780. In this regard, the imaging detector 780 may be configured to capture radiant energy corresponding to an image through interaction with the sensor array 781. The sensor array 781, according to some example embodiments, may be an array of microbolometer devices that can operate at ambient temperatures. An image captured by the imaging detector 780 may be comprised of a plurality of pixels (e.g., one pixel for each sensor device in the sensor array 781). According to some example embodiments, the imaging detector 780 may be configured to provide a pixelated image of radiant energy to the processing circuitry 710 for analysis and blur mitigation. The imaging detector 780 may be further configured to generate a plurality of pixel signals associated with respective pixels of an image.

The apparatus 700 may also comprise an inertial measurement unit (IMU) 785. The IMU 785 may be configured to detect movement and motion of the apparatus 700. In this regard, the IMU 785 may embody or include a gyro. The IMU 785 may be configured to measure the direction and magnitude of the motion of the apparatus 700 and generate motion direction data and motion magnitude data for delivery to the processing circuitry 710 to assist in the blur mitigation.

Further, the apparatus 700 may include a navigation controller 790. In this regard, the navigation controller 790 may be a processing device configured to control the movement of a vehicle, such as an aircraft including a tactical munition by interfacing with steering devices (e.g., flaps, fins, wheels, etc.), an engine or other propulsion device, and the like. In this regard, the apparatus 700 may be operably coupled to, or in communication with, the vehicle. The processing circuitry 710 may be configured to analyze an image of radiant energy that has been modified to mitigate blurring and provide guidance instructions to the navigation controller 790 to steer a vehicle to a point source target.

Additionally, the apparatus 700 may comprise processing circuitry 710 that may be in operative communication with or embody a communications interface 740 and a user interface 750. The processing circuitry 710 may interact with or embody a memory 730 and a processor 720. The processing circuitry 710 is configurable to perform operations described herein. In this regard, the processing circuitry 710 may be configured to perform computational processing and memory management according to an example embodiment. In some embodiments, the processing circuitry 710 may be embodied as a chip or chip set. In other words, the processing circuitry 710 may comprise one or more physical packages (e.g., chips) including materials, components or wires on a structural assembly (e.g., a baseboard). The processing circuitry 710 may be configured to receive inputs (e.g., via peripheral components such as user interface 750, communications interface 740, and including the memory 730), perform actions based on the inputs, and generate outputs (e.g., for provision to peripheral components). In an example embodiment, the processing circuitry 710 may include one or more instances of a processor 720, associated circuitry, and memory 730. As such, the processing circuitry 710 may be embodied as a circuit chip (e.g., an integrated circuit chip, such as a field programmable gate array (FPGA)) configured (e.g., with hardware, software or a combination of hardware and software) to perform operations described herein.

In an example embodiment, the memory 730 may include one or more non-transitory memory devices such as, for example, volatile or non-volatile memory that may be either fixed or removable. The memory 730 may be configured to store information, data, applications, instructions or the like for enabling, for example, object recognition and presentation and to carry out various functions in accordance with exemplary embodiments. For example, the memory 730 could be configured to buffer input data for processing by the processing circuitry 710. Additionally or alternatively, the memory 730 could be configured to store instructions for execution by the processing circuitry 710. Among the contents of the memory 730, applications may be stored for execution by the processing circuitry 710 in order to carry out the functionality associated with each respective application.

As mentioned above, the processing circuitry 710 may be embodied in a number of different ways. For example, the processing circuitry 710 may be embodied as various processing means such as one or more processors 720 that may be in the form of a microprocessor or other processing element, a coprocessor, a controller or various other computing or processing devices including integrated circuits such as, for example, an ASIC (application specific integrated circuit), an FPGA, or the like. In an example embodiment, the processing circuitry 710 may be configured to execute instructions stored in the memory 730 or otherwise accessible to the processing circuitry 710. As such, whether configured by hardware or by a combination of hardware and software, the processing circuitry 710 may represent an entity (e.g., physically embodied in circuitry—in the form of processing circuitry 710) capable of performing operations according to example embodiments while configured accordingly. Thus, for example, when the processing circuitry 710 is embodied as an ASIC, FPGA, or the like, the processing circuitry 710 may be specifically configured hardware for conducting the operations described herein. Alternatively, as another example, when the processing circuitry 710 is embodied as an executor of software instructions, the instructions may specifically configure the processing circuitry 710 to perform the operations described herein.

The communication interface 740 may include one or more interface mechanisms for enabling communication with other devices external to apparatus 700, via, for example, a network 741, such as a local area network. In some cases, the communication interface 740 may be any means such as a device or circuitry embodied in either hardware, or a combination of hardware and software that is configured to receive or transmit data from/to devices in communication with the processing circuitry 710. The communications interface 740 may be a wired or wireless interface and may support various communications protocols.

The user interface 750 may be controlled by the processing circuitry 710 to interact with a user. In this regard, via the user interface 750, the processing circuitry 710 may be configured to output to a user via an output device such as, for example, driving a display 751 and receive input from a user via an input device 752 such as, for example, audio input, which may be, for example, a microphone. The user interface 750 may also produce outputs, for example, via audio output, which may be for example, a speaker. According to some example embodiments, the user interface may also operably couple to other user input devices such as, for example, a keyboard, mouse, touch screen, or the like.

In an example embodiment, the processing circuitry 710 may be embodied as, include or otherwise control, the apparatus 700 to perform point source image blur mitigation as described herein. As such, in some embodiments, the processing circuitry 710 may be said to cause each of the operations described in connection with, for example, the techniques described with respect to FIGS. 1 through 6, the example method of FIG. 8, and the functionalities otherwise described herein. The processing circuitry 710 may therefore undertake the corresponding functionalities responsive to execution of instructions or algorithms configuring the processing circuitry 710 accordingly. The processing circuitry 710 may provide programmable control signals, selections, and the like to control the operation of the apparatus 700 responsive to execution of instructions stored in the memory 730.

As such, according to some example embodiments, the processing circuitry 710 may be configured to receive the a plurality of pixel signals from the imaging detector 780. The processing circuitry 710 may be further configured to determine a trajectory of a point source within the image due to relative angular motion of the point source across a plurality of pixels of the image and determine a subset of pixels that intersect with the trajectory. Additionally, the processing circuitry 710 may be further configured to determine an estimated location of the point source within the image at an end of the stare time based on the pixel signals for each of the pixels within the subset of pixels.

According to some example embodiments, the processing circuitry 710 may be configured to determine the trajectory to be a linear trajectory. Further, according to some example embodiments, the processing circuitry 710 may be configured to determine the estimated location of the point source at a sub-pixel scale. According to some example embodiments, the processing circuitry 710 may be further configured to apply a point spread function to the trajectory to determine the subset of pixels. Further, the processing circuitry 710 may be further configured to determine the estimated location of the point source based on a blur rate for the point source, according to some example embodiments. According to some example embodiments, the processing circuitry 710 may determine a blur rate for the point source based on data from the inertial measurement unit 785. According to some example embodiments, the processing circuitry 710 may be further configured to determine the estimated location of the point source based on a maximum likelihood function that uses a probability to determine the estimated location based on the pixel signals for the subset of pixels.

Figure 8:
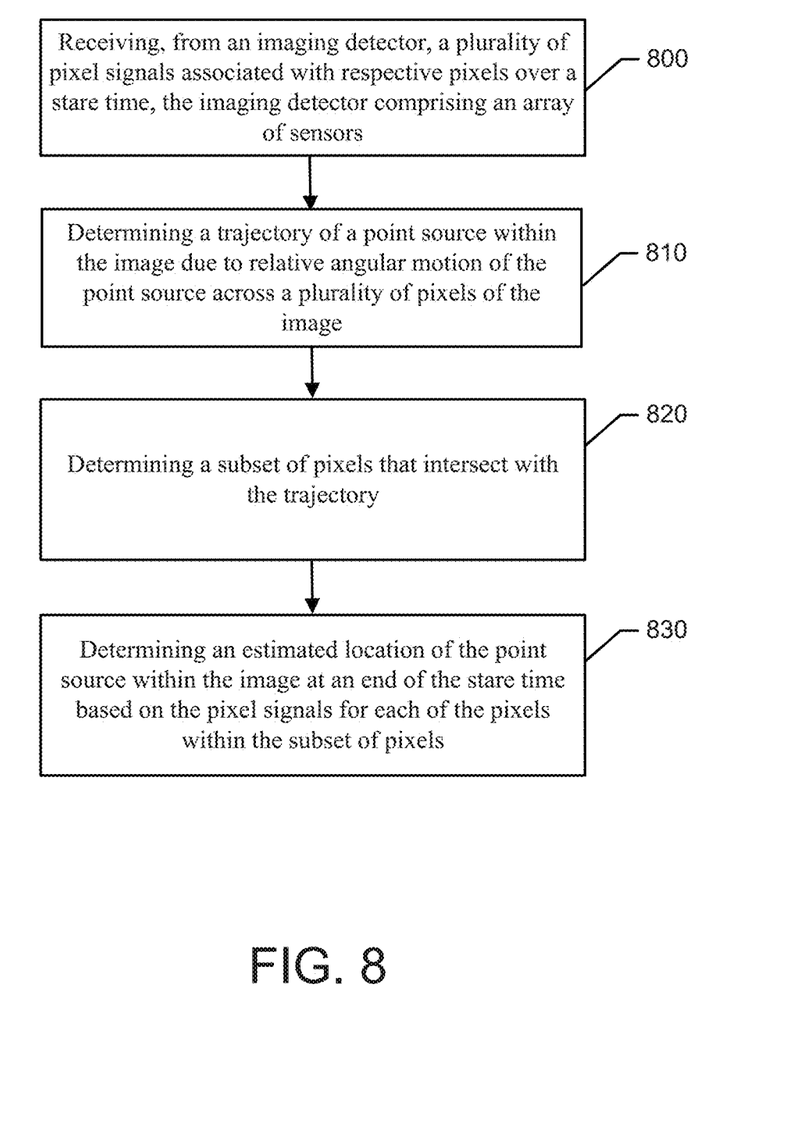
FIG. 8 shows an example method for performing image blur mitigation according to an example embodiment.

Referring now to FIG. 8, a block diagram flow chart of an example method for image blur mitigation is provided. The example method may be implemented by, for example, the apparatus 700. In this regard, the example method may include, at 800, receiving, from an imaging detector, a plurality of pixel signals associated with respective pixels over a stare time. The imaging detector may comprise an array of sensors. At 810, the example method may further include determining a trajectory of a point source within the image due to relative angular motion of the point source across a plurality of pixels of the image, and, at 820, determining a subset of pixels that intersect with the trajectory. The example method may also include, at 830 determining an estimated location of the point source within the image at an end of the stare time based on the pixel signals for each of the pixels within the subset of pixels.

According to some example embodiments, the example method may further comprise applying a point spread function to the trajectory to determine the subset of pixels. According to some example embodiments, the example method may include determining the estimated location of the point source based on a blur rate for the point source. According to some example embodiments, the example method may further comprise determining a blur rate based on data from an inertial measurement unit. Further, according to some example embodiments, the array of sensors may be comprised of microbolometer sensors.

As used herein, the term "module" is intended to include a computer-related entity, such as but not limited to hardware, software, or a combination of hardware and software. For example, a module may be, but is not limited to being a software or hardware implementation of a process, an object, an executable, and/or a thread of execution, which may be implemented via a processor or computer. By way of example, both an application running on a computing device and/or the computing device can be a module. One or more modules can reside within a process and/or thread of execution and a module may be localized on one computer and/or distributed between two or more computers. In addition, these modules can execute from various computer readable media having various data structures stored thereon. The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although such example is described in terms of separate modules corresponding to various functions performed, some examples need not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular entity that is specifically configured in, or can be operably coupled to, processing circuitry to modify the behavior and/or capability of the processing circuitry based on the hardware and/or software that is added to or otherwise operably coupled to the processing circuitry to configure the processing circuitry accordingly.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements or functions, it should be appreciated that different combinations of elements or functions may be provided by alternative embodiments without departing from the scope of the appended claims. In this regard, for example, different combinations of elements or functions than those explicitly described above are also contemplated as may be set forth in some of the appended claims. In cases where advantages, benefits or solutions to problems are described herein, it should be appreciated that such advantages, benefits or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An apparatus for point source de-blurring comprising:
an imaging detector comprising an array of sensors, the imaging detector configured to capture radiant energy corresponding to an image over a stare time and generate a plurality of pixel signals associated with respective pixels of the image; and
processing circuitry configured to:
receive the plurality of pixel signals from the imaging detector;
determine a trajectory of a point source within the image due to relative angular motion of the point source across a plurality of pixels of the image;
determine a subset of pixels that intersect with the trajectory based on a point spread function applied to the trajectory; and
determine an estimated location of the point source within the image at an end of the stare time based on the pixel signals for each of the pixels within the subset of pixels and hypotheses of an uncompensated angular motion rate along the x-axis, an uncompensated angular motion rate along the y-axis, an x-coordinate for the end point of the trajectory, and a y-coordinate for the endpoint of the trajectory that are within a constrained four dimensional hypothesis search space, the hypotheses being applied to a maximum likelihood function to determine the estimated location.

2. The apparatus of claim 1, wherein the processing circuitry configured to determine the estimated location of the point source is further configured to determine the estimated location of the point source at a sub-pixel scale.

3. The apparatus of claim 1, wherein the processing circuitry is further configured to determine the estimated location of the point source based on a blur rate for the point source.

4. The apparatus of claim 1, further comprising an inertial measurement unit; and wherein the processing circuitry may determine the constrained four dimensional hypothesis search space based on motion direction data and motion magnitude data from the inertial measurement unit, the inertial measurement unit being configured to detect motion of the imaging detector.

5. The apparatus of claim 1, wherein the processing circuitry is further configured to determine the estimated location of the point source based on the maximum likelihood function that uses a probability to determine the estimated location based on the pixel signals for the subset of pixels.

6. The apparatus of claim 1, wherein the array of sensors are comprised of microbolometer sensors.

7. The apparatus of claim 1, wherein the processing circuitry is configured to determine the trajectory of the point source as an estimated linear trajectory.

8. The apparatus of claim 1, wherein the processing circuitry is configured to determine the subset of pixels based on a point spread function having a radius of less than one-half pixel.

9. The apparatus of claim 1, wherein the processing circuitry is configured to determine hypotheses for the uncompensated angular motion rate along the x-axis and the uncompensated angular motion rate along the y-axis based on uncertainties for motion direction data and motion magnitude data provided by an inertial measurement unit configured to detect motion of the imaging detector.

10. An apparatus comprising:
an imaging detector comprising an array of sensors, the imaging detector configured to capture radiant energy corresponding to an image over a stare time and generate a plurality of pixel signals associated with respective pixels of the image;
a navigation controller configured to control guidance of a vehicle based on an estimated location of a point source, the apparatus being operably coupled to or in communication with the vehicle; and
processing circuitry configured to:
receive the plurality of pixel signals from the imaging detector;
determine a trajectory of a point source within the image due to relative angular motion of the point source across a plurality of pixels of the image;
determine a subset of pixels that intersect with the trajectory based on a point spread function applied to the trajectory; and
determine an estimated location of the point source within the image at an end of the stare time based on the pixel signals for each of the pixels within the subset of pixels and hypotheses of an uncompensated angular motion rate along the x-axis, an uncompensated angular motion rate along the y-axis, an x-coordinate for the end point of the trajectory, and a y-coordinate for the endpoint of the trajectory that are within a constrained four dimensional hypothesis search space, the hypotheses being applied to a maximum likelihood function to determine the estimated location; and
provide the estimated location of the point source to the navigation controller to control guidance of the vehicle based on the estimated location of the point source.

11. The apparatus of claim 10, wherein the processing circuitry configured to determine the estimated location of the point source is further configured to determine the estimated location of the point source as a sub-pixel scale.

12. The apparatus of claim 10, wherein the processing circuitry configured to determine the estimated location of the point source includes being configured to determine the location of the point source based on the point spread function.

13. The apparatus of claim 10, wherein the processing circuitry is further configured to determine the estimated location of the point source based on a blur rate for the point source.

14. The apparatus of claim 10, further comprising an inertial measurement unit configured to detect motion of the imaging detector; and wherein the processing circuitry may determine the constrained four dimensional hypothesis search space based on motion direction data and motion magnitude data from the inertial measurement unit.

15. The apparatus of claim 10, wherein the processing circuitry is further configured to determine the estimated location of the point source based on the maximum likelihood function using a probability to determine the estimated location based on the pixel signals for the subset of pixels.

16. The apparatus of claim 10, wherein the array of sensors are comprised of microbolometer sensors.

17. A method comprising:
receiving, from an imaging detector, a plurality of pixel signals associated with respective pixels of an image over a stare time, the imaging detector comprising an array of sensors;
determining a trajectory of a point source within the image due to relative angular motion of the point source across a plurality of pixels of the image;
determining a subset of pixels that intersect with the trajectory based on a point spread function applied to the trajectory; and
determining an estimated location of the point source within the image at an end of the stare time based on the pixel signals for each of the pixels within the subset of pixels and hypotheses of an uncompensated angular motion rate along the x-axis, an uncompensated angular motion rate along the y-axis, an x-coordinate for the end point of the trajectory, and a y-coordinate for the endpoint of the trajectory that are within a constrained four dimensional hypothesis search space, the hypotheses being applied to a maximum likelihood function to determine the estimated location.

18. The method of claim 17, wherein determining the estimated location of the point source includes determining the estimated location of the point source based on a blur rate for the point source.

19. The method of claim 17, further comprising determining the constrained four dimensional hypothesis search space based on motion direction data and motion magnitude data from an inertial measurement unit configured to detect motion of the imaging detector.

20. The method of claim 17, wherein the array of sensors are comprised of microbolometer sensors.

* * * * *